United States Patent
Paick

(10) Patent No.: US 12,503,194 B2
(45) Date of Patent: Dec. 23, 2025

(54) DEVICE AND METHOD FOR ASSISTING REVERSE MOVEMENT OF AN ELECTRIC BICYCLE, NON-TRANSITORY COMPUTER READABLE STORAGE MEDIUM STORING A PROGRAM FOR PERFORMING THE METHOD

(71) Applicant: HL MANDO CORPORATION, Pyeongtaek (KR)

(72) Inventor: In Ha Paick, Pyeongtaek (KR)

(73) Assignee: HL MANDO CORPORATION, Pyeongtaek (KR)

( * ) Notice: Subject to any disclaimer, the term of this patent is extended or adjusted under 35 U.S.C. 154(b) by 115 days.

(21) Appl. No.: 18/533,485

(22) Filed: Dec. 8, 2023

(65) Prior Publication Data
US 2024/0409181 A1  Dec. 12, 2024

(30) Foreign Application Priority Data
Jun. 12, 2023  (KR) .................. 10-2023-0074878

(51) Int. Cl.
*B62M 6/50*  (2010.01)
(52) U.S. Cl.
CPC .................... *B62M 6/50* (2013.01)
(58) Field of Classification Search
CPC ..................................................... B62M 6/50
USPC ......................................................... 701/22
See application file for complete search history.

(56) References Cited

U.S. PATENT DOCUMENTS

| | | | |
|---|---|---|---|
| 2014/0080661 A1* | 3/2014 | Paick | B62M 6/55 477/3 |
| 2022/0009588 A1* | 1/2022 | Kawakami | B62J 45/411 |
| 2022/0194520 A1* | 6/2022 | Guzelgunler | B60L 53/16 |
| 2022/0212751 A1* | 7/2022 | Tsukamoto | B62M 6/55 |
| 2022/0296979 A1* | 9/2022 | Rauzier | A63B 24/0062 |
| 2023/0278544 A1* | 9/2023 | Wendt | B62J 27/00 701/1 |
| 2024/0083301 A1* | 3/2024 | Mankowski | B60L 58/12 |
| 2024/0300598 A1* | 9/2024 | Chan | B62J 45/413 |
| 2024/0338926 A1* | 10/2024 | Miller | G06V 10/751 |

FOREIGN PATENT DOCUMENTS

| | | |
|---|---|---|
| KR | 10-2021-0008960 A | 1/2021 |
| KR | 10-2021-0029170 A | 3/2021 |
| KR | 20210110238 A | 9/2021 |
| KR | 10-2022-0082208 A | 6/2022 |

\* cited by examiner

*Primary Examiner* — Mahmoud S Ismail
(74) *Attorney, Agent, or Firm* — Harvest IP Law, LLP

(57) ABSTRACT

Disclosed are a device and method for assisting reverse movement of an electric bicycle, and a non-transitory computer readable storage medium storing a program for performing the method. The device for assisting reverse movement of an electric bicycle according to an aspect of the present disclosure is a device for assisting reverse movement of an electric bicycle that can receive driving force for rotation of a wheel from a motor, and may include a rear sensor capable of detecting an object present at the rear of the electric bicycle; and a controller that, when the electric bicycle moves backwards, determines whether braking control of the motor is necessary based on detection information from the rear sensor, and performs braking control of the motor if it is determined that braking control of the motor is necessary.

17 Claims, 7 Drawing Sheets

DEVICE AND METHOD FOR ASSISTING REVERSE MOVEMENT OF AN ELECTRIC BICYCLE, NON-TRANSITORY COMPUTER READABLE STORAGE MEDIUM STORING A PROGRAM FOR PERFORMING THE METHOD

CROSS-REFERENCE TO RELATED APPLICATION

This application claims priority to and the benefit of Korean Patent Application No. 10-2023-0074878, filed on Jun. 12, 2023, the disclosure of which is incorporated herein by reference in its entirety.

BACKGROUND

1. Technical Field

The present disclosure relates to a device and method for assisting reverse movement of an electric bicycle, and a non-transitory computer readable storage medium storing a program for performing the method, and more particularly, to a device and method for assisting reverse movement of an electric bicycle capable of performing braking control of a motor of an electric bicycle when the electric bicycle is reversing, and a non-transitory computer readable storage medium storing a program for performing the method.

2. Discussion of Related Art

An electric bicycle is a bicycle in which the driving force of a motor can be transmitted to the wheel. An electric bicycle may move by adding the driving force of the motor to the wheel by the user's direct pedal rotation force. In addition, an electric bicycle may be moved solely by the driving force of the motor.

Electric bicycles provide driving force from a motor that assists or replaces the user's human power, so their range of uses is wider than that of conventional bicycles, which were mainly used only as a means of personal transportation. Recently, electric bicycles have emerged as a way to solve logistics and mobility problems in complex cities. Accordingly, the distribution of three- to four-wheeled electric bicycles that can transport cargo or passengers is increasing.

As such, as the range of use of electric bicycles expands, a reverse function, which was not necessary for conventional bicycles, is being required. In particular, since electric bicycles for transporting cargo generally load cargo at the rear, there is a great need for a reverse function during the process of moving to load or unload cargo.

However, conventional electric bicycles often do not have a reverse function. In addition, even though electric bicycles have a reverse function, a problem has been pointed out that the functions related to ensuring safety when reversing are insufficient.

SUMMARY

The present disclosure is to solve the above problems, and the present disclosure is directed to providing a device and method for assisting reverse movement of an electric bicycle that ensures safety when reversing an electric bicycle that can receive driving force for rotation of the wheel from the motor, and a non-transitory computer readable storage medium storing a program for performing the method.

In addition, the present disclosure is also directed to providing a device and method for assisting reverse movement of an electric bicycle that improves stability when reversing an electric bicycle by dually determining whether there is a risk at the rear of the electric bicycle and the reverse speed, and a non-transitory computer readable storage medium storing a program for performing the method.

The objects of the present disclosure are not limited to the above-described objects, and other objects that are not mentioned will be able to be clearly understood by those skilled in the art to which the present disclosure pertains from the following description.

According to an aspect of the present disclosure, provided is a device for assisting reverse movement of an electric bicycle that can receive driving force for rotation of a wheel from a motor, the device including a rear sensor capable of detecting an object present at the rear of the electric bicycle; and a controller that, when the electric bicycle moves backwards, determines whether braking control of the motor is necessary based on detection information from the rear sensor, and performs braking control of the motor if it is determined that braking control of the motor is necessary.

In the device for assisting reverse movement of an electric bicycle according to an aspect of the present disclosure, the rear sensor may include one or more of a proximity sensor, radar, ultrasonic sensor, and image sensor.

In the device for assisting reverse movement of an electric bicycle according to an aspect of the present disclosure, the rear sensor may include an image sensor.

In the device for assisting reverse movement of an electric bicycle according to an aspect of the present disclosure, the electric bicycle may be a chainless electric bicycle in which a chain is not connected between the motor and the wheel.

In the device for assisting reverse movement of an electric bicycle according to an aspect of the present disclosure, the controller may determine that braking control of the motor is necessary if it is determined that there is a collision risk object at the rear of the electric bicycle based on the detection information of the rear sensor.

In the device for assisting reverse movement of an electric bicycle according to an aspect of the present disclosure, the controller may block the current supplied to the motor during the braking control.

In the device for assisting reverse movement of an electric bicycle according to an aspect of the present disclosure, the controller may add torque to the motor in a direction opposite to the driving direction of the motor during the braking control.

The device for assisting reverse movement of an electric bicycle according to an aspect of the present disclosure may further include a speed sensor that detects a reverse speed when the electric bicycle is moving backwards.

In the device for assisting reverse movement of an electric bicycle according to an aspect of the present disclosure, the speed sensor may measure the speed of the wheel.

In the device for assisting reverse movement of an electric bicycle according to an aspect of the present disclosure, if it is determined that braking control of the motor is not necessary based on the detection information of the rear sensor, the controller may additionally determine whether a reverse speed detected by the speed sensor exceeds a set reference reverse speed.

In the device for assisting reverse movement of an electric bicycle according to an aspect of the present disclosure, if it is determined that the reverse speed exceeds the reference reverse speed, the controller may perform braking control of the motor.

In the device for assisting reverse movement of an electric bicycle according to an aspect of the present disclosure, the reference reverse speed may be set in the range of 15 to 25 km/h.

According to another aspect of the present disclosure, provided is a method for assisting reverse movement of an electric bicycle that can receive driving force for rotation of a wheel from a motor, the method including: determining, by a controller, whether the electric bicycle is moving backwards; determining, by the controller, whether there is a risk requiring braking control of the motor; and performing, by the controller, braking control of the motor if it is determined that the risk exists.

In the method for assisting reverse movement of an electric bicycle according to another aspect of the present disclosure, the determining whether there is a risk may include: detecting, by a rear sensor, the rear of the electric bicycle; and determining, by the controller, whether a collision risk object exists at the rear of the electric bicycle based on detection information of the rear sensor.

In the method for assisting reverse movement of an electric bicycle according to another aspect of the present disclosure, in the performing braking control, the controller may block the current supplied to the motor.

In the method for assisting reverse movement of an electric bicycle according to another aspect of the present disclosure, in the performing braking control, the controller may add torque to the motor in a direction opposite to the driving direction of the motor during the braking control.

The method for assisting reverse movement of an electric bicycle according to another aspect of the present disclosure may further include determining, by the controller, whether the reverse speed of the electric bicycle exceeds a set reference reverse speed if it is determined that the risk does not exist.

The method for assisting reverse movement of an electric bicycle according to another aspect of the present disclosure may further include performing, by the controller, braking control of the motor if it is determined that the risk does not exist and the reverse speed exceeds the reference reverse speed.

In the method for assisting reverse movement of an electric bicycle according to another aspect of the present disclosure, the reference reverse speed may be set in the range of 15 to 25 km/h.

In the method for assisting reverse movement of an electric bicycle according to another aspect of the present disclosure, the determining whether the reference reverse speed is exceeded may include: detecting, by a speed sensor, a reverse speed of the electric bicycle; and determining, by the controller, whether the reverse speed detected by the speed sensor exceeds the reference reverse speed.

In the method for assisting reverse movement of an electric bicycle according to another aspect of the present disclosure, in the detecting a reverse speed, the speed sensor may measure the speed of the wheel.

In the method for assisting reverse movement of an electric bicycle according to another aspect of the present disclosure, the electric bicycle may be a chainless electric bicycle in which a chain is not connected between the motor and the wheel.

According to yet another aspect of the present disclosure, provided is a non-transitory computer-readable storage medium having stored thereon a program including at least one instruction for performing the method for assisting reverse movement of an electric bicycle.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
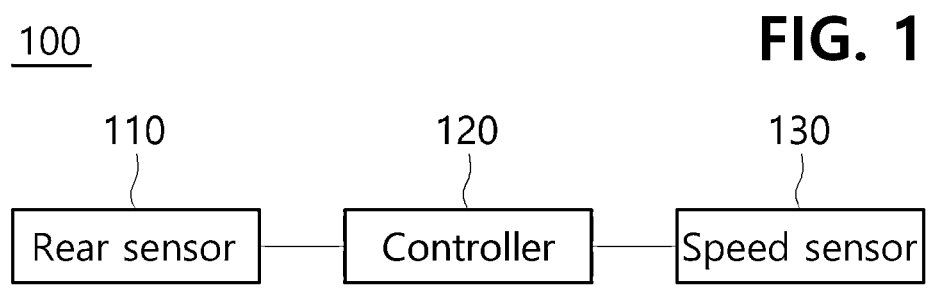
FIG. 1 is a diagram illustrating a configuration of a device for assisting reverse movement of an electric bicycle according to an embodiment of the present disclosure.

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their invention.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

Figure 2:
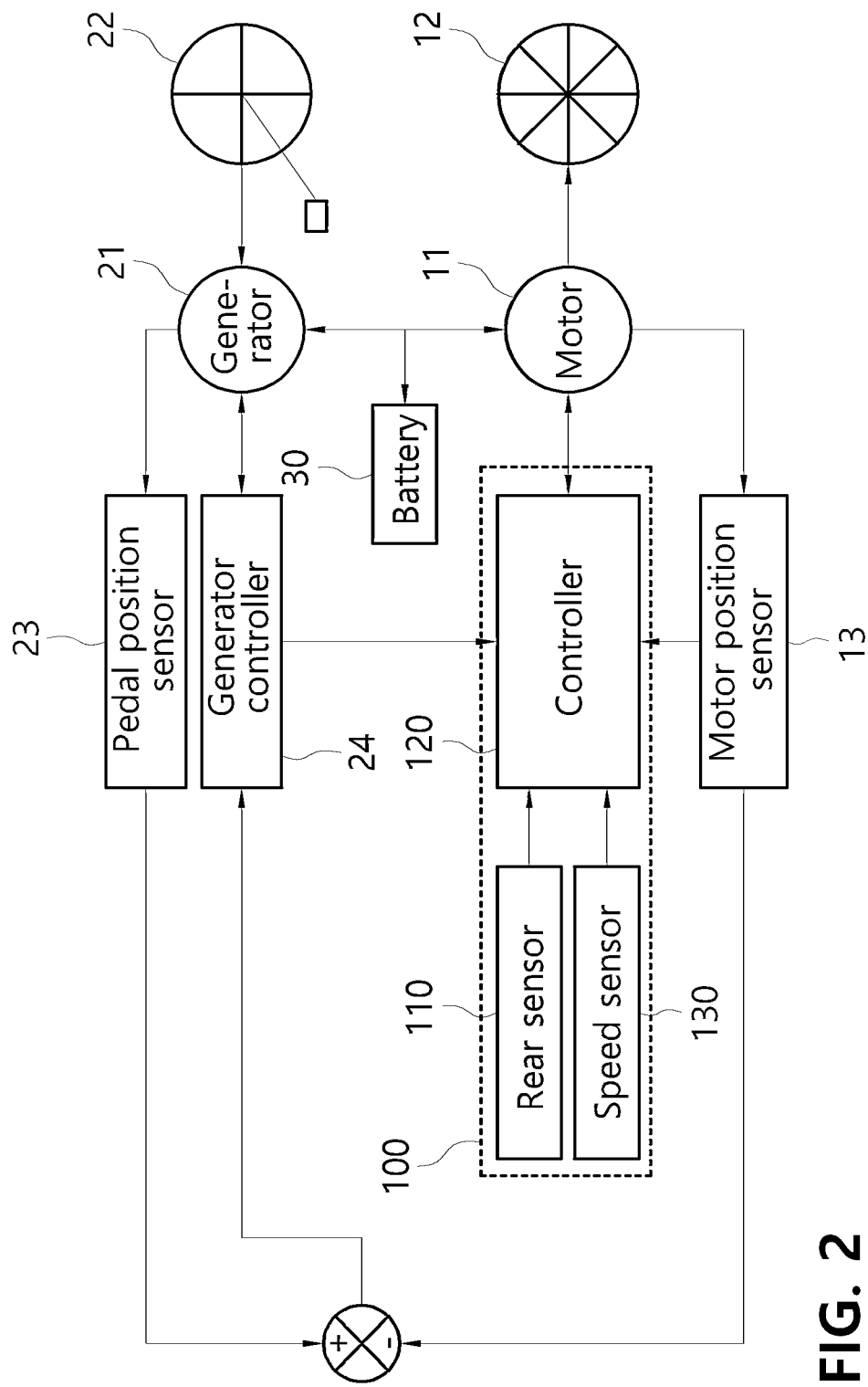
FIG. 2 is a diagram illustrating a configuration of an electric bicycle equipped with a device for assisting reverse movement of an electric bicycle according to an embodiment of the present disclosure.

FIG. 1 is a diagram illustrating a configuration of a device for assisting reverse movement of an electric bicycle according to an embodiment of the present disclosure. In addition, FIG. 2 is a diagram illustrating a configuration of an electric bicycle equipped with a device for assisting reverse movement of an electric bicycle according to an embodiment of the present disclosure.

The device 100 for assisting reverse movement of an electric bicycle according to an embodiment of the present disclosure may be placed on an electric bicycle in which a motor 11 can provide driving force for rotation of a wheel 12. The electric bicycle may provide the driving force of the motor 11 to the wheel 12 in addition to the force with which the user pedals. In addition, the electric bicycle may provide the driving force of the motor 11 to the wheel 12 in place of the force with which the user pedals.

The electric bicycle may be a chainless electric bicycle in which a chain is not connected between the motor 11 and the wheel 12. This is an example, and the electric bicycle on which the device 100 for assisting reverse movement of an electric bicycle according to an embodiment of the present disclosure can be placed is not limited to chainless electric bicycles. In other words, the type of electric bicycle on which the device 100 for assisting reverse movement of an electric bicycle according to an embodiment of the present disclosure can be used is not particularly limited.

There is also no limit to the number of wheels 12 of the electric bicycle. The electric bicycle may have three or more wheels. For example, the electric bicycle is for transporting cargo or passengers and may have three or four wheels.

Meanwhile, the electric bicycle is a means of transportation having a form in which a motor can transmit driving force to the wheels, and may even include means of transportation that are not classified as automobiles. For example, the electric bicycle on which the device 100 for assisting reverse movement of an electric bicycle according to an embodiment of the present disclosure can be used may even include a motorcycle.

Referring to FIGS. 1 and 2, the device 100 for assisting reverse movement of an electric bicycle according to an embodiment of the present disclosure may be used in an electric bicycle that can receive driving force for rotation of the wheel 12 from the motor 11, and may include a rear sensor 110 and a controller 120.

The rear sensor 110 may detect objects present at the rear of the electric bicycle. In more detail, the rear sensor 110 may be installed on the electric bicycle to detect a certain area at the rear of the electric bicycle. The rear sensor 110 may include any sensor capable of detecting an object.

Figure 3:
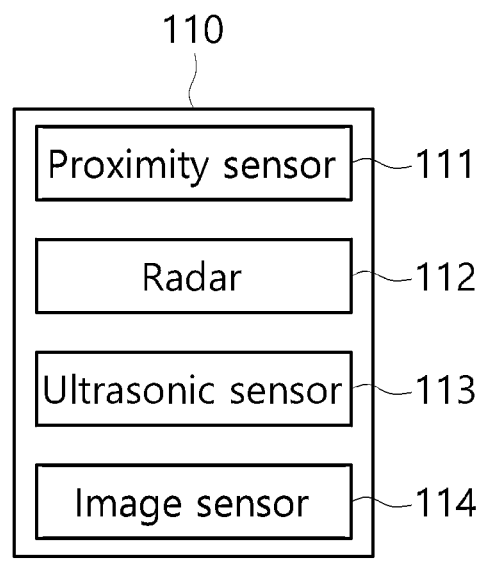
FIG. 3 is a diagram illustrating an exemplary configuration of a rear sensor of a device for assisting reverse movement of an electric bicycle according to an embodiment of the present disclosure.

FIG. 3 is a diagram illustrating an exemplary configuration of a rear sensor of a device for assisting reverse movement of an electric bicycle according to an embodiment of the present disclosure.

Referring to FIG. 3, the rear sensor 110 may include one or more of a proximity sensor 111, a radar 112, an ultrasonic sensor 113, and an image sensor 114.

The proximity sensor 111 may transmit an electromagnetic field or electromagnetic wave (for example, infrared rays) and detect a reflected signal. The radar 112 uses radio waves to measure objects within the detection range, the distance to the objects, and so on. The ultrasonic sensor 113 detects objects through ultrasonic pulses. The image sensor 114 may be a camera, lidar, etc.

In the device 100 for assisting reverse movement of an electric bicycle according to an embodiment of the present disclosure, the rear sensor 110 may include one or more of a proximity sensor 111, a radar 112, an ultrasonic sensor 113, and an image sensor 114. For example, the rear sensor 110 of the device 100 for assisting reverse movement of an electric bicycle according to an embodiment of the present disclosure may have a proximity sensor 111, a radar 112, and an ultrasonic sensor 113.

When the electric bicycle moves backwards, the controller 120 determines whether braking control of the motor 11 is necessary based on detection information from the rear sensor 110. The controller 120 may perform braking control of the motor 11 if it is determined that braking control of the motor 11 is necessary.

Here, the braking control means controlling the motor 11 so that the electric bicycle stops or the reverse speed of the electric bicycle decreases while the electric bicycle is moving backwards. Meanwhile, the controller 120 may determine whether the electric bicycle is moving backwards based on the driving direction of the motor 11, the rotation direction of the wheel 12, the acceleration direction, etc.

When it is determined that there is a collision risk object at the rear of the electric bicycle based on the detection information of the rear sensor 110, the controller 120 may determine that braking control of the motor 11 is necessary. For example, the controller 120 may determine that an object existing within a predetermined distance at the rear of the electric bicycle is a collision risk object.

When any one of the plurality of sensors included in the rear sensor 110 detects an object within a predetermined distance, the controller 120 may determine that there is a collision risk object at the rear of the electric bicycle. That is, when one or more of the plurality of sensors included in the rear sensor 110 detects an object within a predetermined distance, the controller 120 may determine that there is a collision risk object at the rear of the electric bicycle.

For example, if the rear sensor 110 includes one or more of the proximity sensor 111, radar 112, and ultrasonic sensor 113, the controller 120 may determine that there is a collision risk object at the rear of the electric bicycle when any one or more of the proximity sensor 111, radar 112, and ultrasonic sensor 113 detects an object existing within a predetermined distance.

As such, when one or more of the plurality of sensors included in the rear sensor 110 detects an object within a predetermined distance and the controller 120 determines that there is a collision risk object at the rear of the electric bicycle, even if some of the plurality of sensors included in the rear sensor 110 fail, it can be accurately determined whether a risk exists at the rear. Accordingly, the reliability of determination as to whether braking control of the motor 11 is necessary can be improved.

Meanwhile, the controller 120 may determine that there is a collision risk object at the rear of the electric bicycle when at least two of the plurality of sensors in the rear sensor 110 detect an object within a predetermined distance. For example, if the rear sensor 110 includes one or more of the proximity sensor 111, radar 112, and ultrasonic sensor 113, the controller 120 may determine that there is a collision risk object at the rear of the electric bicycle when at least two of the proximity sensor 111, radar 112, and ultrasonic sensor 113 detect an object existing within a predetermined distance.

As such, when at least two of the plurality of sensors included in the rear sensor 110 detect an object within a predetermined distance and the controller 120 determines that there is a collision risk object at the rear of the electric bicycle, it is possible to avoid cases where it is incorrectly determined that there is a risk of collision due to misdetection by the rear sensor 110 even though there is no object.

The controller 120 may perform braking control of the motor 11 when it is determined that braking control of the motor 11 is necessary. The controller 120 may perform braking control of the motor 11 as follows.

The controller 120 may block the current supplied to the motor 11 during the braking control. In this case, since the electric bicycle is moving backwards, the driving direction of the motor 11 is the direction in which the wheel 12 is rotated so that the electric bicycle moves backwards. When the controller 120 blocks the current supplied to the motor 11, driving of the motor 11 may be stopped. Accordingly, the electric bicycle may be braked. That is, the controller 120 may stop driving the motor 11 so that the electric bicycle stops.

During the braking control, the controller 120 may add torque to the motor 11 in a direction opposite to the driving direction of the motor 11. In this case, since the electric bicycle is moving backwards, the driving direction of the motor 11 is the direction in which the wheel 12 is rotated so that the electric bicycle moves backwards. When the controller 120 adds torque to the motor 11 in a direction opposite to the driving direction of the motor 11, the driving of the motor 11 may be stopped. Accordingly, the electric bicycle may be braked. In other words, the controller 120 may add torque to the motor 11 in a direction opposite to the driving direction of the motor 11 so that the electric bicycle stops.

It may also be considered that the controller 120 regulates the current supplied to the motor 11 during the braking control. For example, the controller 120 may reduce the driving force of the motor 11 by reducing the current supplied to the motor 11.

The method in which the controller 120 performs braking control of the motor 11 as described above may be selectively performed. In addition, the controller 120 may perform braking control of the motor 11 in two or more ways together or sequentially.

Meanwhile, referring to FIG. 1, the device 100 for assisting reverse movement of an electric bicycle according to an embodiment of the present disclosure may further include a speed sensor 130.

The speed sensor 130 detects the reverse speed when the electric bicycle moves backwards. The speed sensor 130 may be installed on the electric bicycle to measure the speed of the electric bicycle. For example, the speed sensor 130 may measure the speed of the wheel 12. That is, the speed sensor 130 may be a wheel speed sensor.

If it is determined that braking control of the motor 11 is not necessary based on the detection information of the rear sensor 110, the controller 120 may additionally determine whether a reverse speed detected by the speed sensor 130 exceeds a set reference reverse speed.

Even when there is no collision risk object at the rear of the electric bicycle, if the reverse speed of the electric bicycle is fast, immediate braking cannot be performed when a situation requiring emergency braking occurs. Accordingly, the risk of accidents increases.

To prevent accidents due to such unexpected situations, the controller 120 may additionally determine the risk of an accident based on the reverse speed of the electric bicycle. In more detail, if it is determined that braking control of the motor 11 is not necessary based on the detection information of the rear sensor 110, the controller 120 may additionally determine the risk of an accident based on whether the reverse speed detected by the speed sensor 130 exceeds a set reference reverse speed.

In the device 100 for assisting reverse movement of an electric bicycle according to an embodiment of the present disclosure, the reference reverse speed may be set in the range of 15 to 25 km/h. For example, the reference reverse speed may be set to 20 km/h.

The controller 120 may perform braking control of the motor 11 if it is determined that the reverse speed exceeds the reference reverse speed. As described above with regard to braking control of the motor 11, the controller 120 may block the current supplied to the motor 11. In addition, the controller 120 may add torque to the motor 11 in a direction opposite to the driving direction of the motor 11. Meanwhile, it may also be considered that the controller 120 regulates the current supplied to the motor 11 during the braking control.

The driving of the motor 11 may be stopped when the controller 120 blocks the current supplied to the motor 11 or adds torque to the motor 11 in a direction opposite to the driving direction of the motor 11. Accordingly, the reverse speed of the electric bicycle may decrease. In addition, the electric bicycle may stop.

Meanwhile, the controller 120 may independently determine whether a collision risk object exists based on the detection information of the rear sensor 110 and whether the reverse speed detected by the speed sensor 130 exceeds the reference reverse speed. That is, the controller 120 may determine whether the reverse speed exceeds the reference reverse speed regardless of whether it is determined that there is a collision risk object at the rear.

The controller 120 may independently or in parallel determine whether there is a collision risk object based on the detection information of the rear sensor 110 and whether the reverse speed detected by the speed sensor 130 exceeds the reference reverse speed, and may independently or in parallel utilize the result of determining whether there is a collision risk object and the result of determining whether the reverse speed exceeds the reverse reference speed.

For example, if it is determined that there is a collision risk object at the rear of the electric bicycle based on the detection information of the rear sensor 110, or if it is determined that the reverse speed detected by the speed sensor 130 exceeds the set reference reverse speed, the controller 120 may perform braking control of the motor 11.

In more detail, if it is determined that there is a collision risk object at the rear of the electric bicycle based on the detection information of the rear sensor 110, the controller 120 may stop the electric bicycle by performing braking control of the motor 11 regardless of the reverse speed of the electric bicycle. In addition, if it is determined that the reverse speed detected by the speed sensor 130 exceeds the set reference reverse speed, the controller 120 may reduce the reverse speed of the electric bicycle or stop the electric bicycle by performing braking control of the motor 11 regardless of whether there is a collision risk object.

Controller 120 may include one or more processors for calculation. The processor may include one or more IC chips. In addition, the controller 120 may include a storage medium for storage. For example, the storage medium may be random access memory (RAM), flash memory, etc. In addition, the controller 120 may include a circuit board on which one or more processors, storage media, etc. are placed.

The configuration and operation of the device 100 for assisting reverse movement of an electric bicycle according to an embodiment of the present disclosure has been described. Hereinafter, other configurations and operations of the electric bicycle shown in FIG. 2 will be briefly described.

When a user steps on a pedal 22, the force of stepping on the pedal 22 is transmitted to a generator 21. For example, the generator 21 may be an alternator. The generator 21 may operate by the force of stepping on the pedal 22, and a battery 30 may be charged through the power generated by the generator 21. Hereinafter, the position of the pedal 22 may be understood as corresponding to the position of the generator 21.

The motor 11 may receive power from the battery 30. As seen above, the driving force of the motor 11 is transmitted to the wheel 12. For example, the motor 11 may be placed in the hub of wheel 12. In addition, components such as gears and reducers may be disposed between the motor 11 and the wheel 12.

A motor position sensor 13 may detect the rotational position of the motor 11 when the motor 11 is driven. The position of the motor 11 detected by the motor position sensor 13 may be transmitted to the controller 120 of the device 100 for assisting reverse movement of an electric bicycle according to an embodiment of the present disclosure. In addition, the position of the motor 11 detected by the motor position sensor 13 may also be transmitted to a generator controller 24.

A pedal position sensor 23 may receive signals related to the driving of the pedal 22 and determine the position of the pedal 22. For example, the pedal position sensor 23 may receive one or more of the position and torque of the generator 21 according to the rotation of the pedal 22.

The generator controller 24 may determine the required position of the pedal 22 by receiving the position of the motor 11 detected by the motor position sensor 13 and the position of the pedal 22 detected by the pedal position sensor 23. In addition, the generator controller 24 may generate a control current to control the position of the pedal 22.

When determining the required position of the pedal 22, the generator controller 24 may reflect the gain corresponding to the gear ratio to the position of the motor 11 detected by the motor position sensor 13. In addition, when generating the control current, the generator controller 24 may reflect the gain according to the driving mode, such as assist level.

The generator controller 24 regulates the current controlling the torque of the generator 21 based on the difference between the control current and the current of the generator 21. The load on the pedal 22 may be adjusted by the generator controller 24 controlling the torque of the generator 21.

The controller 120 of the device 100 for assisting reverse movement of an electric bicycle according to an embodiment of the present disclosure controls the current supplied to the motor 11. The controller 120 may utilize the control current generated by the generator controller 24 to control the motor 11. In addition, the controller 120 may reflect the gain due to the driving mode, etc. when controlling the motor 11.

Meanwhile, when the electric bicycle moves backwards, the controller 120 determines whether braking control of the motor 11 is necessary, and if it is determined that braking control of the motor 11 is necessary, the controller 120 may perform braking control of the motor 11. This is the same as described above.

Figure 4:
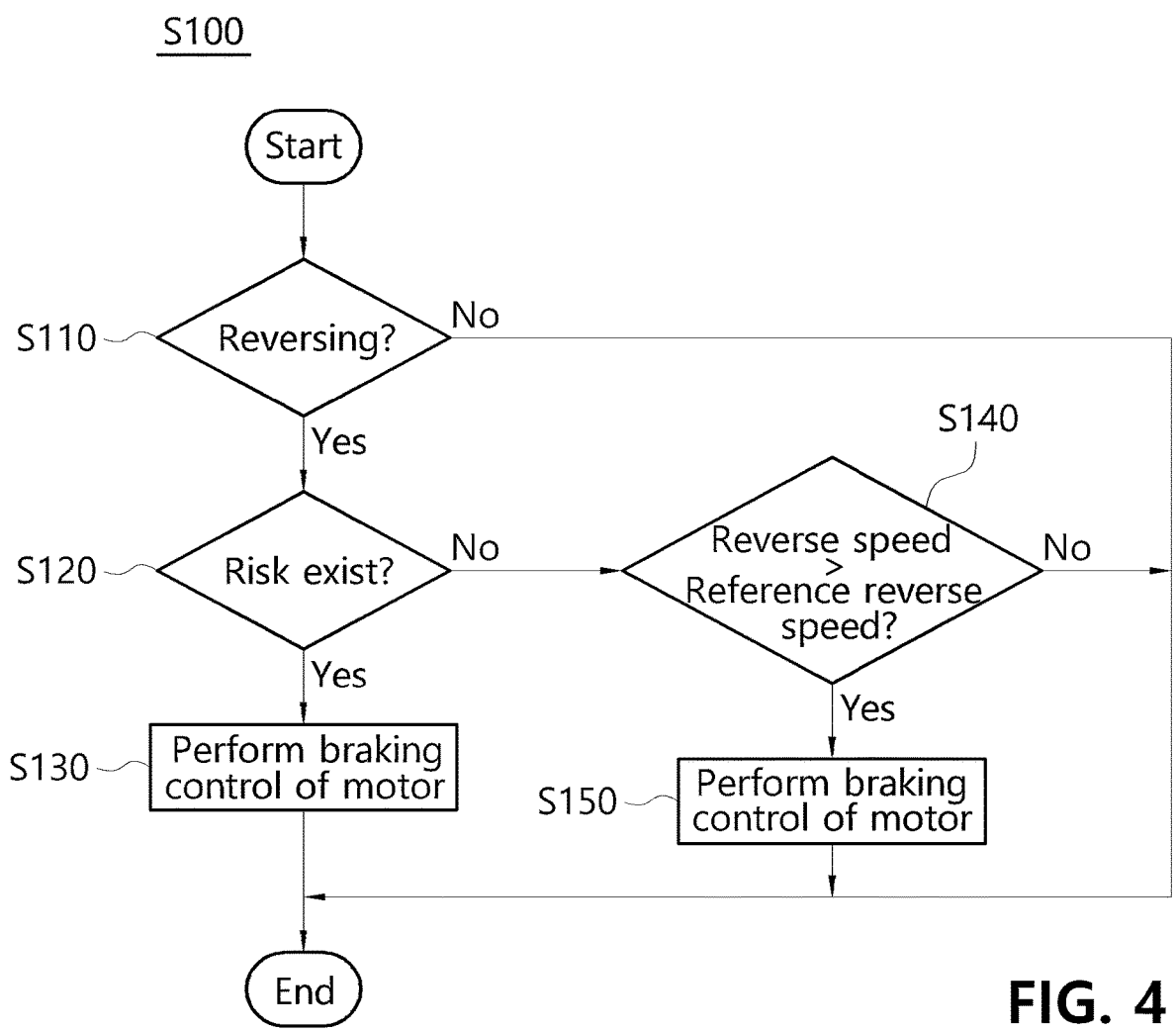
FIG. 4 is a flowchart of a method for assisting reverse movement of an electric bicycle according to an embodiment of the present disclosure.

FIG. 4 is a flowchart of a method for assisting reverse movement of an electric bicycle according to an embodiment of the present disclosure.

The method S100 for assisting reverse movement of an electric bicycle according to an embodiment of the present disclosure may be performed by the device 100 for assisting reverse movement of an electric bicycle according to an embodiment of the present disclosure. In this case, the electric bicycle may be a chainless electric bicycle in which a chain is not connected between the motor and the wheel. However, this is an example, and the types of electric bicycles to which the method S100 for assisting reverse movement of an electric bicycle according to an embodiment of the present disclosure can be applied are not limited by the embodiments.

Referring to FIG. 4, the method S100 for assisting reverse movement of an electric bicycle according to an embodiment of the present disclosure is a method for assisting reverse movement of an electric bicycle that can receive driving force for rotation of the wheel 12 from the motor 11 and can be performed as follows.

First, the controller 120 determines whether the electric bicycle is moving backwards at step S110. For example, the controller 120 may determine whether the electric bicycle is moving backwards based on the driving direction of the motor 11. In addition, the controller 120 may determine whether the electric bicycle is moving backwards based on the rotation direction of the wheel to be measured by the speed sensor 130. In addition, the controller 120 may determine whether the electric bicycle is moving backwards based on the direction of acceleration measured by an acceleration sensor, and so on.

Next, the controller 120 determines whether there is a risk requiring braking control of the motor 11 at step S120. Here, the braking control means controlling the motor 11 so that the electric bicycle stops or the reverse speed of the electric bicycle decreases while the electric bicycle is moving backwards.

When it is determined that there is a collision risk object at the rear of the electric bicycle based on the detection information of the rear sensor 110, the controller 120 may determine that braking control of the motor 11 is necessary. For example, the controller 120 may determine that an object existing within a predetermined distance at the rear of the electric bicycle is a collision risk object.

Figure 5:
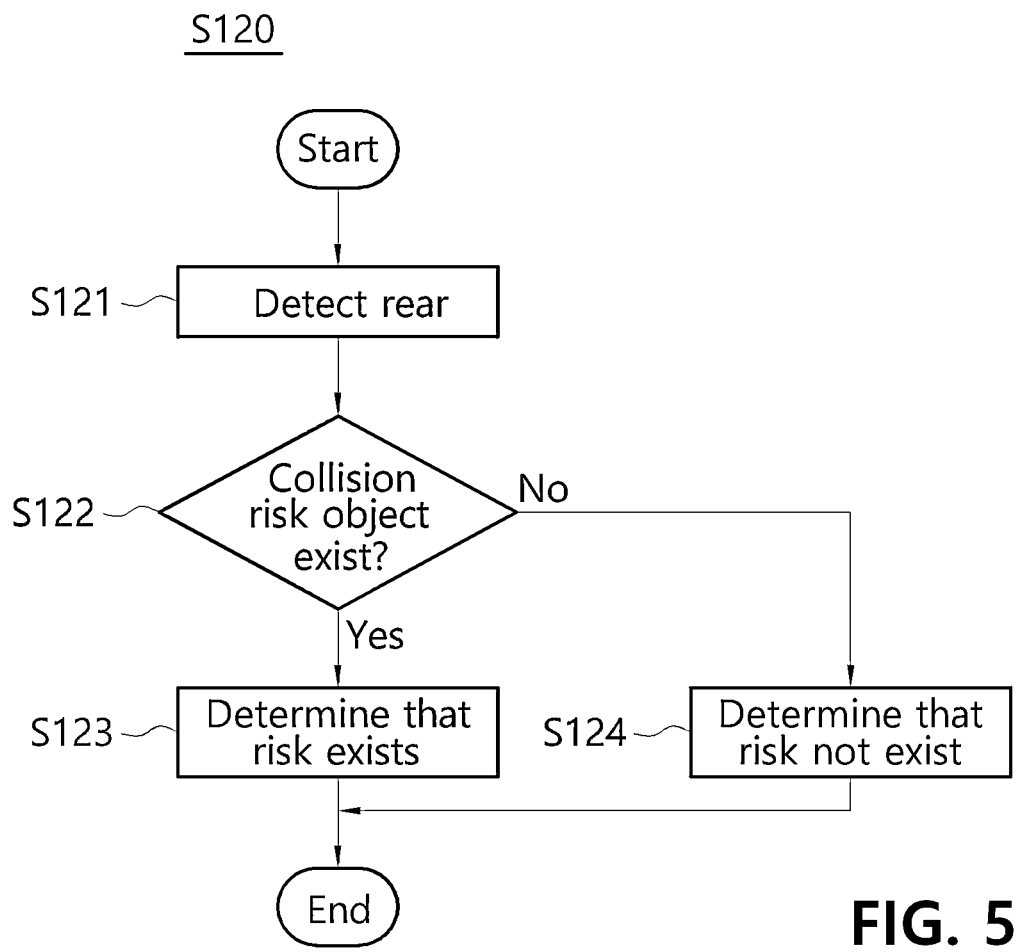
FIG. 5 is a detailed flowchart of a step of determining whether a risk exists in a method for assisting reverse movement of an electric bicycle according to an embodiment of the present disclosure.

FIG. 5 is a detailed flowchart of a step of determining whether a risk exists in a method for assisting reverse movement of an electric bicycle according to an embodiment of the present disclosure.

Referring to FIG. 5, the step of determining whether the risk exists can be performed as follows.

First, the rear sensor 110 detects the rear of the electric bicycle at step S121. The rear sensor 110 may be installed on the electric bicycle to detect a certain area at the rear of the electric bicycle.

The rear sensor 110 may include any sensor capable of detecting an object. For example, the rear sensor 110 may include one or more of a proximity sensor 111, a radar 112, an ultrasonic sensor 113, and an image sensor 114.

Next, the controller 120 determines whether a collision risk object exists at the rear of the electric bicycle based on the detection information of the rear sensor 110 at step S122. When one or more of the plurality of sensors included in the rear sensor 110 detects an object within a predetermined distance, the controller 120 may determine that there is a collision risk object at the rear of the electric bicycle.

As such, when one or more of the plurality of sensors included in the rear sensor 110 detects an object within a predetermined distance and the controller 120 determines that there is a collision risk object at the rear of the electric bicycle, even if some of the plurality of sensors included in the rear sensor 110 fail, it can be accurately determined whether a risk exists at the rear. Accordingly, the reliability of determination as to whether braking control of the motor 11 is necessary can be improved.

Meanwhile, the controller 120 may determine that there is a collision risk object at the rear of the electric bicycle when at least two of the plurality of sensors in the rear sensor 110 detect an object within a predetermined distance. For example, if the rear sensor 110 includes one or more of the proximity sensor 111, radar 112, and ultrasonic sensor 113, the controller 120 may determine that there is a collision risk object at the rear of the electric bicycle when at least two of the proximity sensor 111, radar 112, and ultrasonic sensor 113 detect an object existing within a predetermined distance.

As such, when at least two of the plurality of sensors included in the rear sensor 110 detect an object within a predetermined distance and the controller 120 determines that there is a collision risk object at the rear of the electric bicycle, it is possible to avoid cases where it is incorrectly determined that there is a risk of collision due to misdetection by the rear sensor 110 even though there is no object.

Next, if it is determined that a collision risk object exists at the rear of the electric bicycle, the controller 120 may determine that a risk exists at step S123. In this case, it may be determined that braking control of the motor 11 is necessary.

Meanwhile, if it is determined that there is no collision risk object at the rear of the electric bicycle, the controller 120 may determine that there is no risk at step S124. In this case, it may be determined that braking control of the motor 11 is not necessary.

As a result of determining whether such a risk exists, if the controller 120 determines that the risk exists, it performs braking control of the motor 11 at step S130. The controller 120 can perform braking control of the motor 11 as follows.

When performing braking control of the motor 11, the controller 120 may block the current supplied to the motor 11. When the controller 120 blocks the current supplied to the motor 11, driving of the motor 11 may be stopped. Accordingly, the electric bicycle may be braked. That is, the controller 120 may block the current supplied to the motor 11 so that the electric bicycle stops.

In addition, when performing braking control of the motor 11, the controller 120 may add torque to the motor 11 in a direction opposite to the driving direction of the motor 11. Accordingly, the electric bicycle may be braked. In other words, the controller 120 may add torque to the motor 11 in a direction opposite to the driving direction of the motor 11 so that the electric bicycle stops.

Meanwhile, when performing braking control of the motor 11, it may also be considered that the controller 120 regulates the current supplied to the motor 11. For example, the controller 120 may reduce the driving force of the motor 11 by reducing the current supplied to the motor 11.

This braking control method of the motor 11 can be selectively performed. In addition, two or more braking control methods for the motor 11 may be performed together or sequentially.

Next, if it is determined that the risk does not exist, the controller 120 may determine whether the reverse speed of the electric bicycle exceeds a set reference reverse speed at step S140. Even when there is no collision risk object at the rear of the electric bicycle, it may be difficult to respond to an emergency situation if the reverse speed of the electric bicycle is too fast. To prevent accidents due to unexpected situations while the electric bicycle is reversing, the controller 120 may additionally determine the risk of an accident based on the reverse speed of the electric bicycle.

In the method S100 for assisting reverse movement of an electric bicycle according to an embodiment of the present disclosure, the reference reverse speed may be set in the range of 15 to 25 km/h. In more detail, the reference reverse speed may be set to 20 km/h.

Figure 6:
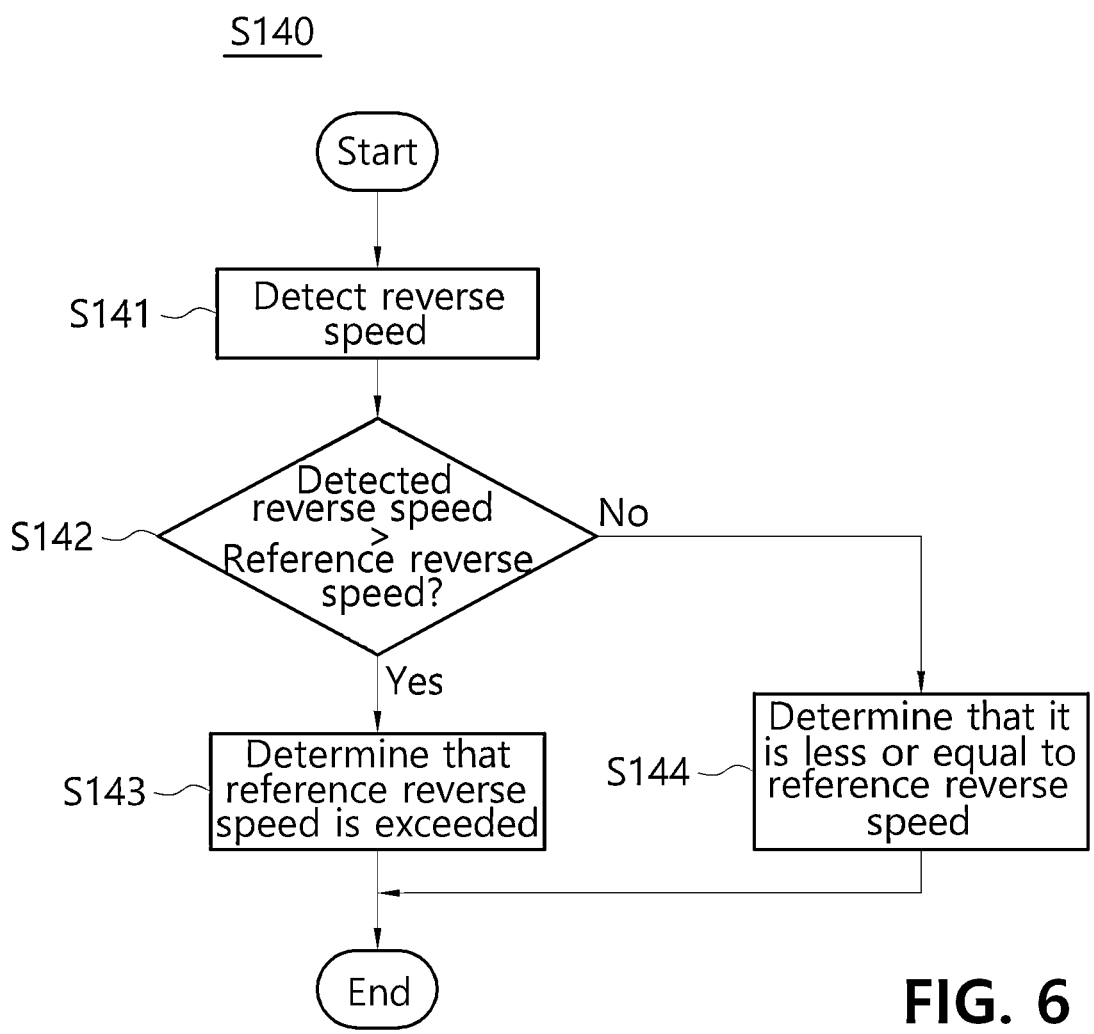
FIG. 6 is a detailed flowchart of a step of determining whether a reference reverse speed is exceeded in a method for assisting reverse movement of an electric bicycle according to an embodiment of the present disclosure.

FIG. 6 is a detailed flowchart of a step of determining whether a reference reverse speed is exceeded in a method for assisting reverse movement of an electric bicycle according to an embodiment of the present disclosure.

Referring to FIG. 6, the step of determining whether the reference reverse speed is exceeded can be performed as follows.

First, the speed sensor 130 detects the reverse speed of the electric bicycle at step S141. The speed sensor 130 may be installed on the electric bicycle to measure the speed of the electric bicycle. For example, the speed sensor 130 may measure the speed of the wheel 12. That is, the speed sensor 130 may be a wheel speed sensor.

Next, the controller 120 determines whether the reverse speed detected by the speed sensor 130 exceeds the reference reverse speed at step S142. The controller 120 may regard the speed detected by the speed sensor 130 as the reverse speed of the electric bicycle, and compare the speed detected by the speed sensor 130 with the reference reverse speed.

Next, if the reverse speed detected by the speed sensor 130 is greater than the reference reverse speed, the controller 120 may determine that the reverse speed exceeds the reference reverse speed. In this case, it may be determined that braking control of the motor 11 is necessary.

Meanwhile, if the reverse speed detected by the speed sensor 130 is less than or equal to the reference reverse speed, the controller 120 may determine that the reverse speed is less than or equal to the reference reverse speed. In this case, it may be determined that braking control of the motor 11 is not necessary.

Finally, if it is determined that the risk does not exist and the reverse speed exceeds the reference reverse speed, the controller 120 performs braking control of the motor 11 at step S150. When performing braking control of the motor 11, the controller 120 may block the current supplied to the motor 11. In addition, when performing braking control of the motor 11, the controller 120 may add torque to the motor 11 in a direction opposite to the driving direction of the motor 11. Meanwhile, when performing braking control of the motor 11, it may also be considered that the controller 120 regulates the current supplied to the motor 11.

The mentioned braking control method of the motor 11 can be selectively performed. In addition, two or more braking control methods for the motor 11 may be performed together or sequentially.

Figure 7:
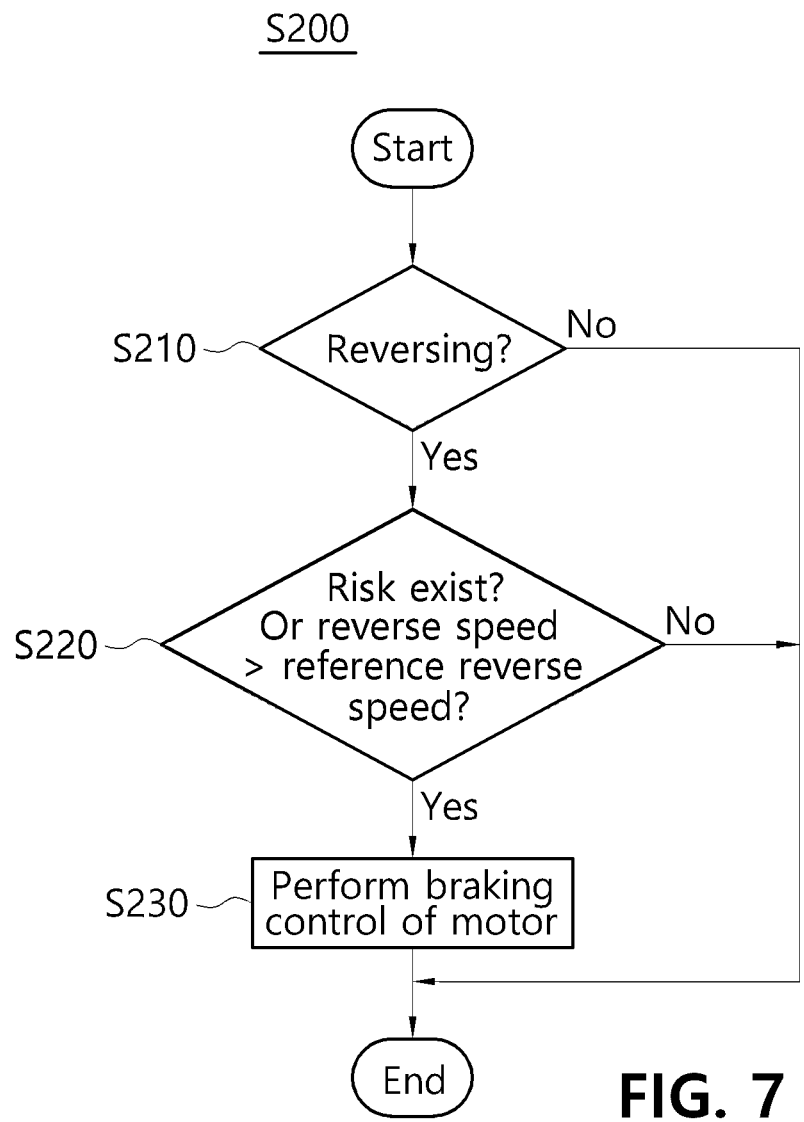
FIG. 7 is a flowchart of a method for assisting reverse movement of an electric bicycle according to another embodiment of the present disclosure.

FIG. 7 is a flowchart of a method for assisting reverse movement of an electric bicycle according to another embodiment of the present disclosure.

The method S200 for assisting reverse movement of an electric bicycle according to another embodiment of the present disclosure may be performed by the device 100 for assisting reverse movement of an electric bicycle according to an embodiment of the present disclosure. In this case, the electric bicycle may be a chainless electric bicycle in which a chain is not connected between the motor and the wheel. However, this is an example, and the types of electric bicycles to which the method S200 for assisting reverse movement of an electric bicycle according to another embodiment of the present disclosure can be applied are not limited by the embodiments.

Referring to FIG. 7, the method S200 for assisting reverse movement of an electric bicycle according to another embodiment of the present disclosure is a method for assisting reverse movement of an electric bicycle that can receive driving force for rotation of the wheel 12 from the motor 11 and can be performed as follows.

First, the controller 120 determines whether the electric bicycle is moving backwards at step S210. For example, the controller 120 may determine whether the electric bicycle is moving backwards based on the driving direction of the motor 11. In addition, the controller 120 may determine whether the electric bicycle is moving backwards based on the rotation direction of the wheel to be measured by the speed sensor 130. In addition, the controller 120 may determine whether the electric bicycle is moving backwards based on the direction of acceleration measured by an acceleration sensor, and so on.

Next, the controller 120 determines whether there is a risk requiring braking control of the motor 11 and whether the reverse speed of the electric bicycle exceeds the set reference reverse speed at step S220. Here, the braking control means controlling the motor 11 so that the electric bicycle stops or the reverse speed of the electric bicycle decreases while the electric bicycle is moving backwards.

Compared to the method S100 for assisting reverse movement of an electric bicycle according to an embodiment of the present disclosure, the method S200 for assisting reverse movement of an electric bicycle according to another embodiment of the present disclosure is different in that it independently or in parallel determines whether a risk exists and determines whether the reverse speed of the electric bicycle exceeds the reference reverse speed, and it independently or in parallel utilizes the result of determining whether there is a collision risk object and the result of determining whether the reverse speed exceeds the reverse reference speed.

That the controller 120 determines whether a risk exists and that the controller 120 determines whether the reverse speed exceeds the reference reverse speed are the same as those described in relation to the method S100 for assisting reverse movement of an electric bicycle according to an embodiment of the present disclosure. Therefore, detailed explanations related to the determination process are omitted.

In the method S200 for assisting reverse movement of an electric bicycle according to another embodiment of the present disclosure, if it is determined that there is a collision risk object at the rear of the electric bicycle based on the detection information of the rear sensor 110, or if it is determined that the reverse speed detected by the speed sensor 130 exceeds the set reference reverse speed, the controller 120 may determine that braking control of the motor 11 is necessary.

In more detail, if it is determined that there is a collision risk object at the rear of the electric bicycle based on the detection information of the rear sensor 110, the controller 120 may determine that braking control of the motor 11 is necessary regardless of the reverse speed of the electric bicycle. In addition, if it is determined that the reverse speed detected by the speed sensor 130 exceeds the set reference reverse speed, the controller 120 may determine that braking control of the motor 11 is necessary regardless of whether there is a collision risk object.

In the method S200 for assisting reverse movement of an electric bicycle according to another embodiment of the present disclosure, the reference reverse speed may be set in the range of 15 to 25 km/h. In more detail, the reference reverse speed may be set to 20 km/h.

As a result of determining whether such a risk exists and the reverse speed, if it is determined that the risk exists or the reverse speed exceeds the reference reverse speed, the controller 120 performs braking control of the motor 11 at step S230. When performing braking control of the motor 11, the controller 120 may block the current supplied to the motor 11. In addition, when performing braking control of the motor 11, the controller 120 may add torque to the motor 11 in a direction opposite to the driving direction of the motor 11. Meanwhile, when performing braking control of the motor 11, it may also be considered that the controller 120 regulates the current supplied to the motor 11.

This braking control method of the motor 11 as described above can be selectively performed. In addition, two or more braking control methods for the motor 11 may be performed together or sequentially.

Meanwhile, the present disclosure provides a non-transitory computer-readable storage medium having stored thereon a program including at least one instruction for performing the method for assisting reverse movement of an electric bicycle according to an embodiment of the present disclosure. In this case, the instructions may include not only machine code generated by a compiler but also higher level language code executable by a computer.

The recording medium may include a hardware device configured to store and perform program instructions such as a hard disk, a magnetic medium such as a floppy disk and a magnetic tape, an optical medium such as a compact disk read only memory (CD-ROM) and a digital video disk (DVD), a magneto-optical medium such as a floptical disk, a read-only memory (ROM), a random access memory (RAM), a flash memory, and the like.

According to the above configuration, the device and method for assisting reverse movement of an electric bicycle, and the non-transitory computer readable storage medium storing a program for performing the method according to the present disclosure can ensure safety by performing braking control of a motor if a risk is detected when reversing an electric bicycle, which can receive driving force for rotation of the wheel from the motor.

In addition, the device and method for assisting reverse movement of an electric bicycle, and the non-transitory computer readable storage medium storing a program for performing the method according to the present disclosure can improve the stability of the electric bicycle when reversing by comprehensively considering whether there is a risk at the rear of the electric bicycle and the reverse speed.

It should be understood that the effects of the present disclosure are not limited to the above-described effects, and include all effects inferable from a configuration of the invention described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

What is claimed is:

1. A device for assisting reverse movement of an electric bicycle that can receive driving force for rotation of a wheel from a motor, the device comprising:
   a rear sensor capable of detecting an object present at the rear of the electric bicycle;
   a controller that, when the electric bicycle moves backwards, determines whether braking control of the motor is necessary based on detection information from the rear sensor, and performs braking control of the motor if it is determined that braking control of the motor is necessary; and a speed sensor that detects a reverse speed when the electric bicycle is moving backwards, wherein if it is determined that braking control of the motor is not necessary based on the detection information of the rear sensor, the controller additionally determines whether a reverse speed detected by the speed sensor exceeds a set reference reverse speed.

2. The device for assisting reverse movement of an electric bicycle of claim 1, wherein the rear sensor comprises one or more of a proximity sensor, radar, ultrasonic sensor, and image sensor.

3. The device for assisting reverse movement of an electric bicycle of claim 1, wherein the electric bicycle is a chainless electric bicycle in which a chain is not connected between the motor and the wheel.

4. The device for assisting reverse movement of an electric bicycle of claim 1, wherein the controller determines that braking control of the motor is necessary if it is determined that there is a collision risk object at the rear of the electric bicycle based on the detection information of the rear sensor.

5. The device for assisting reverse movement of an electric bicycle of claim 1, wherein the controller blocks the current supplied to the motor during the braking control.

6. The device for assisting reverse movement of an electric bicycle of claim 1, wherein the controller adds torque to the motor in a direction opposite to the driving direction of the motor during the braking control.

7. The device for assisting reverse movement of an electric bicycle of claim 1, wherein if it is determined that the reverse speed exceeds the reference reverse speed, the controller performs braking control of the motor.

8. The device for assisting reverse movement of an electric bicycle of claim 7, wherein the reference reverse speed is set in the range of 15 to 25 km/h.

9. A method for assisting reverse movement of an electric bicycle that can receive driving force for rotation of a wheel from a motor, the method comprising:

determining, by a controller, whether the electric bicycle is moving backwards;

determining, by the controller, whether there is a risk requiring braking control of the motor;

performing, by the controller, braking control of the motor if it is determined that the risk exists; and determining, by the controller, whether the reverse speed of the electric bicycle exceeds a set reference reverse speed if it is determined that the risk does not exist.

10. The method for assisting reverse movement of an electric bicycle of claim 9, wherein the determining whether there is a risk comprises:

detecting, by a rear sensor, the rear of the electric bicycle; and determining, by the controller, whether a collision risk object exists at the rear of the electric bicycle based on detection information of the rear sensor.

11. The method for assisting reverse movement of an electric bicycle of claim 9, wherein, in the performing braking control, the controller blocks the current supplied to the motor.

12. The method for assisting reverse movement of an electric bicycle of claim 9, wherein, in the performing braking control, the controller adds torque to the motor in a direction opposite to the driving direction of the motor during the braking control.

13. The method for assisting reverse movement of an electric bicycle of claim 9, further comprising performing, by the controller, braking control of the motor if it is determined that the risk does not exist and the reverse speed exceeds the reference reverse speed.

14. The method for assisting reverse movement of an electric bicycle of claim 9, wherein the determining whether the reference reverse speed is exceeded comprises:

detecting, by a speed sensor, a reverse speed of the electric bicycle; and determining, by the controller, whether the reverse speed detected by the speed sensor exceeds the reference reverse speed.

15. The method for assisting reverse movement of an electric bicycle of claim 14, wherein, in the detecting a reverse speed, the speed sensor measures the speed of the wheel.

16. The method for assisting reverse movement of an electric bicycle of claim 9, wherein the electric bicycle is a chainless electric bicycle in which a chain is not connected between the motor and the wheel.

17. A non-transitory computer-readable storage medium having stored thereon a program including at least one instruction for performing a method for assisting reverse movement of an electric bicycle, the method comprising:

determining, by a controller, whether the electric bicycle is moving backwards;

determining, by the controller, whether there is a risk requiring braking control of the motor;

performing, by the controller, braking control of the motor if it is determined that the risk exists; and determining, by the controller, whether the reverse speed of the electric bicycle exceeds a set reference reverse speed if it is determined that the risk does not exist.

* * * * *